US008945278B2

(12) United States Patent
Makihira et al.

(10) Patent No.: US 8,945,278 B2
(45) Date of Patent: Feb. 3, 2015

(54) METHOD AND APPARATUS FOR CONCENTRATING OZONE GAS

(75) Inventors: Naohisa Makihira, Tokyo (JP); Sadaki Nakamura, Moriyama (JP); Goichi Inoue, Moriyama (JP); Kunihiko Koike, Moriyama (JP)

(73) Assignee: Iwatani Corporation, Osaka-Shi (JP)

( * ) Notice: Subject to any disclaimer, the term of this patent is extended or adjusted under 35 U.S.C. 154(b) by 50 days.

(21) Appl. No.: 13/597,822

(22) Filed: Aug. 29, 2012

(65) Prior Publication Data
US 2013/0061750 A1 Mar. 14, 2013

(30) Foreign Application Priority Data
Sep. 9, 2011 (JP) .................. 2011-196920

(51) Int. Cl.
*B01D 53/047* (2006.01)
*C01B 13/10* (2006.01)
(52) U.S. Cl.
CPC .............. *B01D 53/047* (2013.01); *C01B 13/10* (2013.01); *B01D 2253/106* (2013.01); *B01D 2256/14* (2013.01); *B01D 2259/40007* (2013.01); *B01D 2259/40035* (2013.01); *B01D 2259/402* (2013.01)
USPC ........................................ 95/103; 422/186.08
(58) Field of Classification Search
USPC ............ 95/96, 103, 138; 96/121; 422/186.07, 422/186.08; 423/581; 210/760
See application file for complete search history.

(56) References Cited

U.S. PATENT DOCUMENTS

| | | | | | |
|---|---|---|---|---|---|
| 5,507,957 | A | * | 4/1996 | Garrett et al. .................. | 210/760 |
| 5,529,607 | A | * | 6/1996 | Tan .................................... | 95/12 |
| 5,755,856 | A | * | 5/1998 | Miyake et al. ................... | 95/101 |
| 5,810,910 | A | * | 9/1998 | Ludwig et al. ................... | 95/138 |
| 5,846,298 | A | * | 12/1998 | Weist, Jr. ......................... | 95/138 |
| 8,404,022 | B2 | * | 3/2013 | Koike et al. ....................... | 95/26 |
| 2010/0005961 | A1 | * | 1/2010 | Koike et al. ....................... | 95/95 |

FOREIGN PATENT DOCUMENTS

| | | |
|---|---|---|
| JP | 61-72602 | 4/1986 |
| WO | 2008/062534 | 5/2008 |

* cited by examiner

*Primary Examiner* — Frank Lawrence
(74) *Attorney, Agent, or Firm* — Rankin, Hill & Clark LLP

(57) ABSTRACT

A method of concentrating ozone gas including: causing ozone gas contained in ozone-oxygen mixture gas to be selectively adsorbed to adsorbents which are filled in a non-cooled state in at least two adsorbing cylinders arranged parallel to one another; desorbing the ozone gas from the adsorbents by subjecting a depressurizing process to each adsorbing cylinder during an ozone gas desorption operation; repeating an adsorption step and a desorption step alternately in the at least two adsorbing cylinders; and controlling the adsorbing cylinders, in such a way that one of the adsorbing cylinders is performing the adsorption step while another one of the adsorbing cylinders is performing the desorption step.

2 Claims, 5 Drawing Sheets

METHOD AND APPARATUS FOR CONCENTRATING OZONE GAS

BACKGROUND OF THE INVENTION (1) Field of the Invention

The present invention relates to a method and an apparatus for supplying ozone gas concentrated within a predetermined concentration range to ozone consumption equipment such as semiconductor manufacturing equipment. More particularly, the present invention relates to a method and an apparatus for purifying ozone gas generated by an ozone generator (ozonizer) and supplying the purified ozone gas as an ozone gas concentrated within a predetermined concentration range.

(2) Description of Related Art

Generally, ozone gas is generated by supplying oxygen gas from an oxygen tank or separated from the atmosphere to an ozone generator. However, even when ozone gas is generated by using oxygen gas from an oxygen tank, the generated ozone gas contained in the oxygen gas has a concentration of as low as approximately 5 vol % to 10 vol %. In addition, due to its great self-decomposability, ozone gas is self-decomposing while flowing through an ozone gas supply route. At a stage where the ozone gas is supplied to ozone gas consumption equipment, a concentration thereof is further decreased and the supply-concentration thereof is unstable by nature. In a semiconductor manufacturing field, recently, the oxidation power of ozone has been increasingly utilized to form an oxidation film on a substrate or some other material. In this case, it is desirable that ozone gas to be supplied have a middle level of stable concentration, in order to stably form an oxidation film of an appropriate thickness in a short period of time.

The applicant has previously proposed a technique in which ozone-oxygen mixture gas is supplied from an ozone generator to adsorbing cylinders filled with an ozone adsorbent being in a non-cooled state whereby the ozone gas is selectively adsorbed to the adsorbents, and in which the adsorbing cylinders are vacuumed during a desorption operation of the ozone gas whereby the ozone gas is desorbed from the adsorbents (refer to WO 2008/062534). Furthermore, a technique has been proposed as well, in which an equalizing tank is attached to a derivation passage for ozone gas desorbed from an adsorbing cylinder, and a decompression section is disposed on the downstream side of the equalizing tank (refer to JP-A-61-72602).

The ozone concentration technique disclosed in WO 2008/062534 enables ozone gas to be concentrated until the concentration thereof is substantially tripled, by repeating the adsorption/desorption of ozone gas to/from the adsorbent being in a non-cooled state. According to an experimental example, this adsorption pressure is 3.4 kPa·G, 7.1 kPa·G, or 12.3 kPa·G.

Typically, as the adsorption pressure increases, the adsorbed amount of ozone gas increases. However, when ozone gas is adsorbed at high pressure, the pressure increases rapidly in the concentrated ozone extraction pipe immediately after the desorption starts. With this, the tendency is found out where the ozone is more likely to self-decompose in the pipe or a decompression section (vacuum pump). Therefore, it seems difficult to increase the adsorbed amount, simply by increasing the pressure.

Meanwhile, the technique disclosed in JP-A-61-72602 in which the equalizing tank is attached to the derivation passage for ozone gas desorbed from the adsorbing cylinder, and the decompression section is disposed on the downstream side of this equalizing tank has the following problem. Although it is possible to prevent the rapid pressure increase in the derivation passage for desorbed ozone gas immediately after the desorption of the ozone gas starts, the performance of the decompression generation section cannot be exerted on the desorption operation of ozone gas which is carried out by the adsorbing cylinder. Accordingly, the desorption pressure does not decrease sufficiently, thereby failing to concentrate ozone gas appropriately.

SUMMARY OF THE INVENTION

The present invention has been made in view of the above problem. An object of the present invention is to provide a method and an apparatus for concentrating ozone gas with simple additional pipes and piping instruments, which are capable of preventing the rapid pressure increase in the apparatus immediately after the desorption of ozone gas starts, and extracting concentrated ozone gas at a higher concentration ratio by increasing adsorption pressure.

To achieve the above object, a first aspect of the present invention provides a method of concentrating ozone gas by which: at least two adsorbing cylinders in each of which an adsorbent is filled in a non-cooled state are arranged parallel to one another; ozone-oxygen mixture gas is caused to act on the adsorbent in a non-cooled state that is contained in each adsorbing cylinder, so that ozone gas is selectively adsorbed to the adsorbents; and a depressurizing process is subjected to each adsorbing cylinder during an ozone gas desorption operation, so that the ozone gas is desorbed from the adsorbents. As a result, the ozone gas is concentrated and purified. Further, an adsorption step and a desorption step are repeated alternately in the at least two adsorbing cylinders, and the adsorbing cylinders are controlled, in such a way that one of the adsorbing cylinders is performing the adsorption step while another one of the adsorbing cylinders is performing the desorption step. In the above method, when the adsorption step of the ozone gas and the desorption step thereof are switched over, one of the adsorbing cylinders that has performed the adsorption step is made to communicate with another one of the adsorbing cylinders that has performed the desorption step, so that internal pressures thereof are equalized, and subsequently, the one of the adsorbing cylinders that has performed the adsorption step is made to communicate with decompression generation section, so that ozone gas is desorbed from the adsorbent therein.

According to a second aspect of the present invention, termination timing of a pressure equalization step is controlled in such a way that the pressure equalization step is terminated at a stage where an internal pressure difference between respective ones of the adsorbing cylinders that have higher and lower internal pressures reaches 40% or less of the internal pressure difference therebetween at the beginning of the pressure equalization step.

According to a third aspect of the present invention, a valve placed on an ozone gas inlet side of one of the adsorbing cylinders that has performed the adsorption step is closed while a valve placed on an outlet side thereof is opened, immediately before the pressure equalization step starts, so that an internal pressure of the one of the adsorbing cylinders is decreased.

According to a fourth aspect of the present invention, at least two adsorbing cylinders in each of which an adsorbent is filled are arranged parallel to one another, a gas introduction valve, a gas derivation valve and a gas discharge valve are attached to each of the adsorbing cylinders, a gas introduction passage to which an ozone generator is attached is connected to the gas introduction valve, a concentrated ozone gas derivation passage to which a vacuum pump is attached is connected to the gas derivation valve, and a gas discharge passage to which an ozone decomposer is attached is connected to the gas discharge valve. In addition, the gas introduction valve and the gas discharge valve attached to each of the adsorbing cylinders are configured to be opened or closed in synchronization with each other, and the gas introduction valve and the gas derivation valve which are attached to the same one of the adsorbing cylinder are controlled to be selectively opened. An adsorption step at which each of the adsorbing cylinders communicates with the gas introduction passage and a desorption step at which each of the adsorbing cylinders communicates with the concentrated ozone gas derivation passage are repeated by turns, and the individual valves are controlled to be switched over in such a way that one of the at least two adsorbing cylinders performs the adsorption step and another one thereof performs the desorption step. At least one system of communication passages which causes interiors of the adsorbing cylinders to communicate with one another are positioned at a location that is closer to the adsorbing cylinders than the valves. Passage open/close valves are attached to the communication passages, and are controlled to be opened or closed in synchronization with the open or close of the gas introduction valve and the gas derivation valve.

In the present invention, the pressure equalization causes a higher internal pressure in each adsorbing cylinder after the adsorption to be decreased to substantially the atmospheric pressure. This prevents the rapid pressure increase in pipes and the decompression generation section immediately after the desorption starts. Also, this prevents ozone gas from self-decomposing and any instrument from being damaged due to the rapid pressure increase. Consequently, it is possible to increase the adsorption pressure in each adsorbing cylinder, thereby increasing the concentration ratio of ozone gas, as well as to decompress the interior of each adsorbing cylinder by directly applying the attraction power of the decompression generation section to the interior, thereby increasing the extraction amount of ozone gas.

Furthermore, the communication passages that cause the interiors of the adsorbing cylinders to communicate with one another are positioned closer to the adsorbing cylinders than the valves attached to gas passages communicating with the adsorbing cylinders, and the passage open/close valves are simply attached to these communication passages. Accordingly, it is possible to further increase the concentration of ozone gas without the need to add many instruments and greatly enlarge an installation space, simply by adding simple pipes and pipe instruments.

DETAILED DESCRIPTION OF PREFERRED EMBODIMENTS

Figure 1:
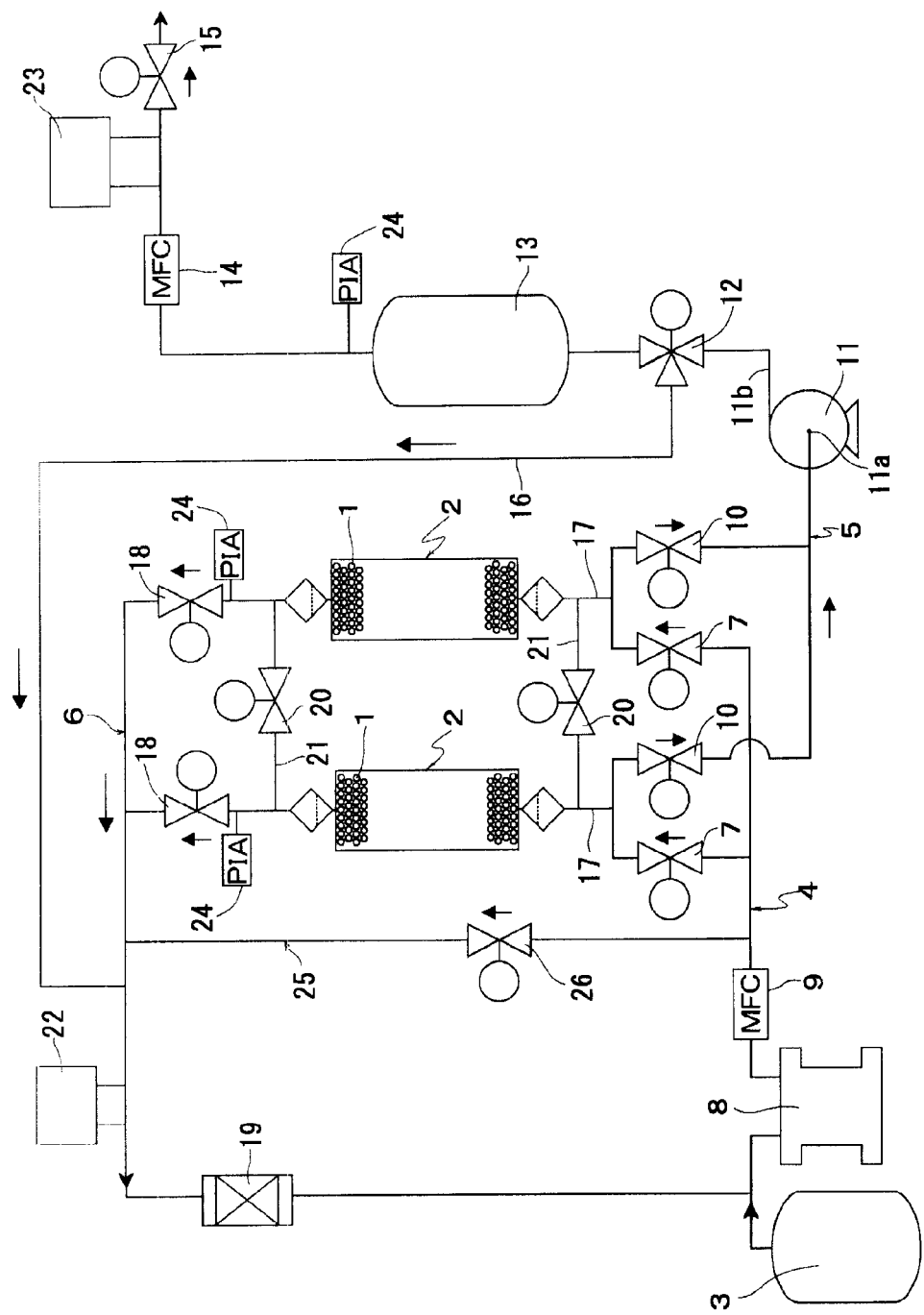
FIG. 1 is a diagram showing an example of a system according to an embodiment of the present invention.

FIG. 1 is a diagram showing an example of a system according to an embodiment of the present invention. This ozone gas concentration apparatus includes adsorbing cylinders 2 in which adsorbents 1 for selectively adsorbing ozone gas, such as silica gel, are filled, a gas introduction passage 4 for connecting each adsorbing cylinder 2 and an ozone raw-material gas source 3 such as an oxygen gas storage vessel so as to communicate with each other, a concentrated ozone gas derivation passage 5 for concentrated ozone gas derived from each adsorbing cylinder 2, and a gas discharge passage 6 for through-gas derived from each adsorbing cylinder 2. In this embodiment, two adsorbing cylinders 2 are arranged parallel to each other, and are configured such that one of the adsorbing cylinders 2 is performing an adsorption step while the other thereof is performing a desorption step.

The gas introduction passage 4 is connected to the respective adsorbing cylinders 2 through corresponding gas introduction valves 7, and an ozone generator 8 and a mass flow controller 9 are arranged in the gas introduction passage 4 in this order from an upstream side thereof. The switching of the gas introduction valves 7 is controlled in such a way that ozone-oxygen mixture gas generated in the ozone generator 8 is supplied alternatively to the respective adsorbing cylinders 2 at a constant flow amount.

Meanwhile, the concentrated ozone gas derivation passage 5 is connected to the respective adsorbing cylinders 2 through corresponding gas derivation valves 10. In the concentrated ozone gas derivation passage 5, a diaphragm vacuum pump 11 that serves as a decompression generation section, a buffer tank 13, a mass flow controller 14, and a passage open/close valve 15 are arranged in this order from the side of the adsorbing cylinder. The switching of the gas derivation valves 10 is controlled in such a way that the adsorbing cylinders 2 communicate with the diaphragm vacuum pump 11 alternatively. In addition, the switching of a passage switching valve 12 can alternately switch between a state where an outlet 11b of the vacuum pump 11 communicates with the buffer tank 13 and a state where the outlet 11b of the vacuum pump 11 communicates with the gas discharge passage 6 through a connection passage 16. The gas introduction passage 4 and the concentrated ozone gas derivation passage 5 are joined together at a location that is closer to the adsorbing cylinders 2 than the locations of the gas introduction valve 7 and the gas derivation valve 10, and joint passages 17 thereof are connected to the corresponding adsorbing cylinders 2.

The gas discharge passage 6 is connected to the respective adsorbing cylinders 2 through corresponding gas-discharge valves 18. An ozone decomposer 19 is disposed in the gas discharge passage 6, and an outlet of this ozone decomposer 19 is connected to the upstream side of the ozone generator 8 in the gas introduction passage 4 so as to communicate with the ozone generator 8. The gas discharge valve 18 attached to each adsorbing cylinder 2 is opened and closed in relation to the open or close operation of the gas introduction valve 7 attached to the adsorbing cylinder 2 that is the same as that to which the gas discharge valve 18 is attached. Accordingly, the gas discharge valve 18 is opened when ozone-oxygen mixture gas is supplied to a corresponding one of the adsorbing cylinders 2, so that oxygen gas which has not been adsorbed to the adsorbent 1 and remaining part of ozone gas which has not been adsorbed thereto are supplied to the ozone decomposer 19.

Parts of the gas discharge passage 6 connected to the adsorbing cylinders 2 which are located upstream of the gas discharge valves 18 (or located closer to the adsorbing cylinders 2 than the gas discharge valves 18) are connected to each other through a communication passage 21 having a passage open/close valve 20 at a midway point thereof so as to communicate with each other. Likewise, the joint passages 17 connected to the respective adsorbing cylinders 2 are connected to each other through another communication passage 21 having another passage open/close valve 20 at a midway point thereof so as to communicate with each other. The cross-section areas of the communication passages 21 are configured to allow a large amount of ozone-oxygen mixture gas to flow through these passages, by comparing the total passage cross-section area of the communication passages 21 with an amount of ozone-oxygen mixture gas to be supplied. In this case, it is assumed that a single communication passage 21 is provided on a side of the adsorbing cylinders 2 from which the ozone-oxygen mixture gas is discharged or a side thereof which is closer to the joint passages 17, only the passage cross-section of this communication passage 21 may become a target to be considered.

In FIG. 1, reference numerals 22 to 26 denote an ozone concentration detector that is attached to the inlet portion of the ozone decomposer 19 in the gas discharge passage 6, another ozone concentration detector that is attached to the outlet side of the mass flow controller 14 in the concentrated ozone gas derivation passage 5, a pressure gage that indicates inner pressures of the adsorbing cylinders 2 and the buffer tank 13, a bypass passage that connects the downstream side of the mass flow controller 9 disposed in the gas introduction passage 4 and the inlet portion of the ozone concentration detector 22 in the gas discharge passage 6 so as to communicate with each other, and a flow passage breaking valve that is attached to the bypass passage 25, respectively.

In the ozone gas concentration apparatus configured above, ozone-oxygen mixture gas generated in the ozone generator 8 is supplied to one of the adsorbing cylinders 2 while the gas introduction valve 7 and the gas discharge valve 18 for the one adsorbing cylinder 2 are opened and the gas derivation valve 10 therefor is closed. As a result, the ozone-oxygen mixture gas passes through the adsorbing cylinder 2. At this time, the adsorbent 1 in the adsorbing cylinder 2 is maintained at the so-called "normal temperature state" (or a state of being naturally left as it is) without being given any thermal energy, such as heating or cooling energy, from the exterior. When the ozone-oxygen mixture gas is supplied to the adsorbing cylinder 2, an ozone gas component therein is adsorbed to the adsorbent 1, and in turn, remaining part of the ozone gas which has not been adsorbed thereto and oxygen gas that serves as carrier gas are fed into the ozone decomposer 19 through the gas discharge passage 6.

When the ozone-oxygen mixture gas that flows through the adsorbing cylinder 2 during a predetermined period is adsorbed to the adsorbent 1 by a predetermined amount, the gas introduction valve 7 for the adsorbing cylinder 2 through which the ozone-oxygen mixture gas has flowed up to this time and a gas discharge valve 18 therefor are closed. Simultaneously, the gas derivation valve 10 for the adsorbing cylinder 2 that has performed the desorption step is closed. Following this, one or both of the passage open/close valves 20 in the respective communication passages 21 that connects the parts of the gas discharge passage 6 and that connects the parts of a joint passage 17 are opened. As a result, the adsorbing cylinder 2 having a higher inner pressure which has completed the adsorption step communicates with the adsorbing cylinder 2 having a lower inner pressure which has completed the desorption step, so that the respective inner pressures in the adsorbing cylinders 2 and 2 are equalized. During this equalizing operation, the gas introduction passage 4 extending from the ozone generator 8 to the adsorbing cylinder 2 is blocked. Even in this case, however, by opening a flow passage breaking valve 26 in the bypass passage 25, the ozone-oxygen mixture gas is fed to the gas discharge passage 6 through the bypass passage 25. This can prevent the blockage of the gas introduction passage 4.

The passage open/close valves 20 are closed, and in turn, a gas derivation valve 10 for the adsorbing cylinder 2 that has performed the adsorption step is opened, so that this adsorbing cylinder 2 communicates with the vacuum pump 11. In response, the inner pressure in the adsorbing cylinder 2 decreases, and the ozone component is vacuum-desorbed from the adsorbent 1 in the adsorbing cylinder 2. At this time, the gas introduction valve 7 and the gas discharge valve 18 for the adsorbing cylinder 2 that has performed the desorption step are opened. In response, ozone-oxygen mixture gas generated by the ozone generator 8 is supplied to one of the adsorbing cylinders 2. As a result, the ozone-oxygen mixture gas flows through the one adsorbing cylinder 2, so that the ozone gas is adsorbed to the adsorbent 1 therein.

By temporarily storing the concentrated ozone gas in the buffer tank 13 which has been desorbed from the adsorbing cylinder 2, the concentration of the ozone gas can be averaged in the buffer tank 13 even if the concentration of the ozone gas desorbed from the adsorbing cylinder 2 is varied. This enables ozone gas to be supplied to ozone consumption equipment and the like while the concentration thereof is maintained within a predetermined range. In this case, concentrated ozone gas supplied to the buffer tank 13 is an ozone gas component that is desorbed in the adsorbing cylinder 2 after an oxygen gas component having been absorbed to an adsorbent 1 therein is desorbed preferentially and is then transferred to the other adsorbing cylinder 2 during the pressure equalization process. Accordingly, this concentrated ozone gas is highly pure. Thus, the ozone gas stored in the buffer tank 13 can have a middle or high level of purity, namely, have a concentration of 20 vol % to 90 vol %.

While one of the adsorbing cylinders 2 is performing the desorption operation, the other is performing the adsorbing operation. In addition, the two adsorbing cylinders 2 and 2 perform the adsorbing and desorbing operations by turns, so as to continuously extract concentrated ozone gas. It should be noted that multiple couples of adsorbing cylinders 2 may be used. By controlling the switching timing of individual valves for multiple couples of adsorbing cylinders 2, the concentrated ozone gas can be extracted continuously.

It is preferable that highly pure silica gel containing a small amount of metal component be used as an adsorbent of this embodiment. However, an ordinary adsorbent such as silica gel, zeolite or the like may also be used.

In the case where ozone utilization equipment permits a predetermined variation range of the concentration of ozone gas, the buffer tank 13 may be omitted and concentrated ozone gas that has been attracted and discharged into the vacuum pump 11 may be supplied to the equipment directly.

Example 1

The two adsorbing cylinders 2 with an internal volume of 1 liter, in each of which highly pure silica gel of 650 grams was filled as the ozone gas adsorbent 1, were arranged parallel to each other. The parts of the gas discharge passage 6 connected to both adsorbing cylinders 2 and 2 communicated with each other through a communication passage 21 having a bore of ⅜ inches. Likewise, the parts of the joint passage 17 connected to both adsorbing cylinders 2 communicated with each other through the communication passage 21 having a bore of ⅜ inches. Then, ozone-oxygen mixture gas was supplied to each adsorbing cylinder 2 through the gas introduction passage 4 with a supply amount of 14.71 slm, and the apparatus was operated under the condition that an adsorption pressure was 100 kPa·G and ultimate pressure upon desorption was −90 kPa·G in each absorbing cylinder 2. Further, the ozone was concentrated under the condition that pressure equalization steps were 0, 0.5, 1, and 1.5 seconds and one adsorption-desorption switching cycle time was 40 seconds. The result is shown in Table 1 and FIGS. 2 and 3.

TABLE 1

| Process | Cycle sec | Pressure equalization sec | Raw-material concentration g/m³ | Raw-material flow amount slm | Ozone gas Concentration g/m³ | Ozone gas flow amount slm | Concentration ratio | Post-step pressure kPa · G |
|---|---|---|---|---|---|---|---|---|
| 1 | 40.0 | 0.0 | 130 | 14.71 | 405 | 3.72 | 3.12 | 100, −90 |
| 2 | 40.0 | 0.5 | 130 | 14.71 | 496 | 2.88 | 3.82 | 70, −60 |
| 3 | 40.0 | 1.0 | 130 | 14.71 | 523 | 2.69 | 4.02 | 40, −30 |
| 4 | 40.0 | 1.5 | 130 | 14.71 | 534 | 2.59 | 4.11 | 10, 0 |

Figure 2:
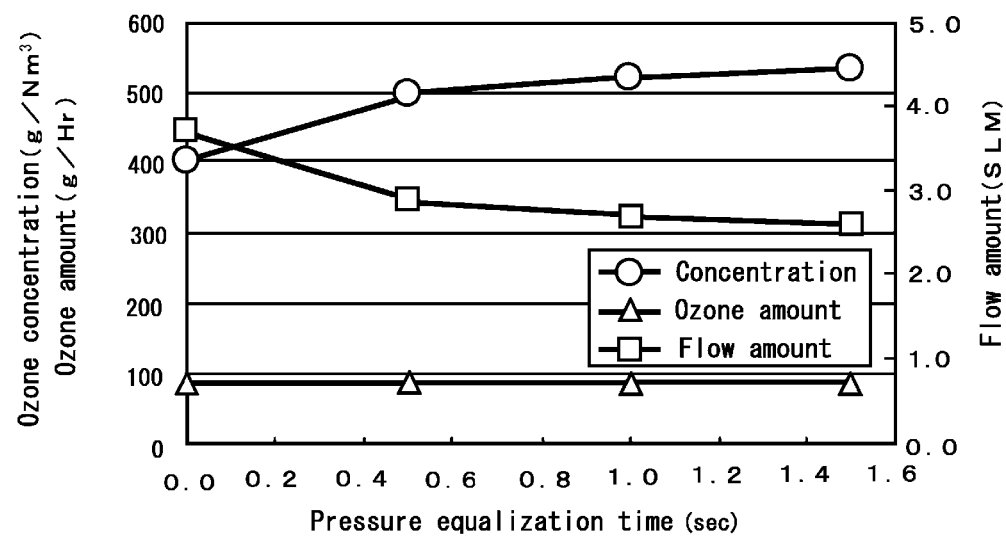
FIG. 2 is a graph showing a relationship between pressure equalization time and each of an ozone concentration, an ozone amount, and an ozone flow amount.

As is evident from Table 1 and FIG. 2, the concentration of ozone to which a pressure equalization process of 1.5 seconds (process 4) is applied is much different from that to which no pressure equalization process (process 1) is applied. Specifically, the ozone concentration is greatly changed from 405 g/m³ to 534 g/m³ (the concentration ratio is changed from 3.12 to 4.11).

Figure 3:
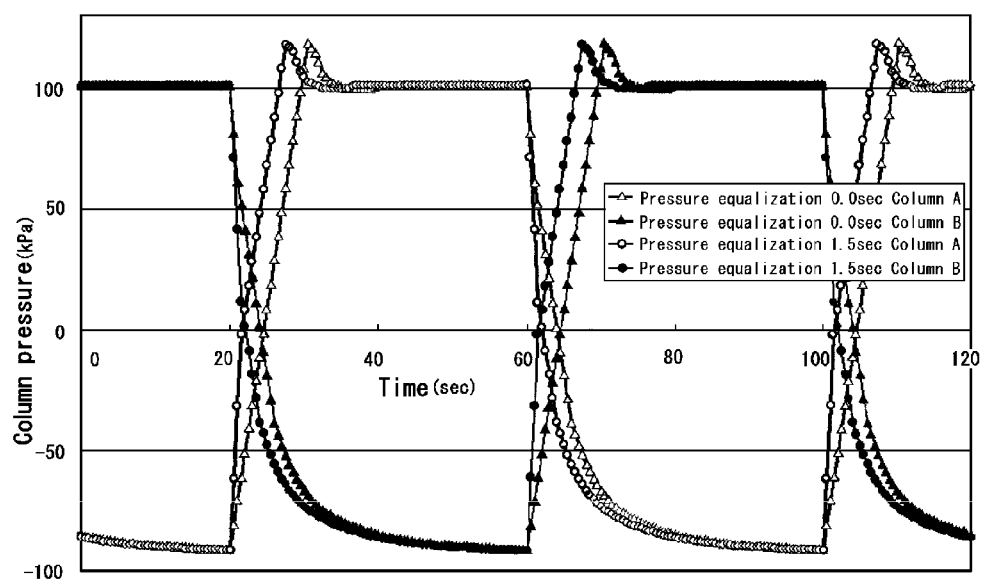
FIG. 3 is a graph showing a relationship between a variation in pressure within an adsorbing cylinder and an elapsed time.
Figure 4:
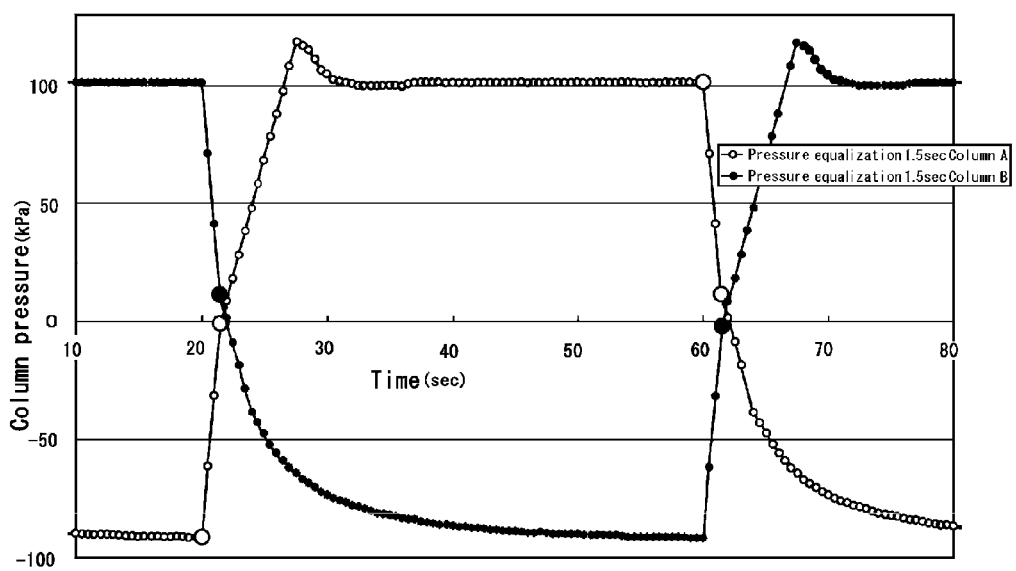
FIG. 4 is a graph showing a relationship between a variation in pressure within an adsorbing cylinder and an elapsed time.

As is evident from FIG. 3, the initial desorption pressure of ozone to which no pressure equalization process (process 1) is applied is 100 kPa·G, whereas the initial desorption pressure of ozone to which a pressure equalization process of 1.5 seconds (process 4) is applied is reduced to approximately 10 kPa·G.

When the initial desorption pressure exceeds 30 kPa·G, a tendency can be found out, where ozone gas is more likely to self-decompose due to the rapid pressure increase immediately after ozone starts being desorbed with the vacuum pump 11. Therefore, the configuration of Example 1 decreases pressure applied to the concentrated ozone gas derivation passage 5 by performing the pressure equalization step. Thus, the configuration of Example 1 is believed to be able to prevent the vacuum pump (decompression generation section) 11 from increasing the pressure rapidly and ozone gas from self-decomposing. This makes it possible to concentrate ozone gas safely with the adsorption pressure of 30 kPa·G or more.

As for the pressure difference between the absorbing cylinders upon completion of the pressure equalization step in Example 1, the process 1 with the pressure equalization time of 0 second, the process 2 with the pressure equalization time of 0.5 seconds, the process 3 with the pressure equalization time of 1.0 seconds, and the process 4 with the pressure equalization time of 1.5 seconds show 190 kPa, 130 kPa, 70 kPa, and 10 kPa, respectively. Thus, the pressure difference decreases in this order. However, when the process with the pressure equalization time of 2.0 seconds is performed, the pressure difference becomes 0. Accordingly, even when the process time is prolonged lasting 2.0 seconds or longer, the further improvement of the concentration ratio is not observed anymore. It is desirable that the pressure equalization step be terminated and the adsorption and desorption steps be switched, before the pressure difference reaches 0 kPa, preferably, at the time when the pressure difference reaches approximately 10% of the initial pressure difference.

As the process step time is longer, the ozone concentration increases more gradually, as shown in FIG. 2. Therefore, even before the pressure difference reaches 0 kPa, it is more preferable that timing when the pressure difference reaches approximately 40% or less of the initial pressure difference be regarded as timing of terminating the pressure equalization step, and the adsorption and desorption steps be switched at this timing. For example, as for the process 3 in which the pressure equalization time was set to 1.0 second, the pressure difference upon completion of the pressure equalization step corresponds to approximately 37% of the initial pressure difference.

In the case of a normal pressure increase in which raw-material ozone gas is supplied to the adsorbing cylinder at 14.71 slm, the pressure increase rate becomes approximately 20 kPa/sec. In contrast, in Example 1 using the two communication passages 21 each having a bore of ⅜ inches, the pressure increase rate is 60 kPa/sec during the pressure equalization step.

By performing the pressure equalization step, part of ozone gas in one adsorbing cylinder 2 that has completed the adsorption may leak into the other adsorbing cylinder 2 that has completed the desorption. However, any significant decrease in ozone amount is not observed in Example 1. The reason for this is as follows. The process 4 has the higher initial pressure increase rate. Then, looking at a retention time during which the adsorption pressure is equal to or more than a predetermined value (100 kPa·G), the process 1 without the pressure equalization process and the process 4 with the pressure equalization process show 30 seconds and 33 seconds, respectively, in a cycle of 40 seconds. Thus, the process 4 has the longer retention time, and therefore, the adsorbed amount thereof is increased. Consequently, it is considered that this increase in the absorption amount makes up for the decrease in the ozone amount. Moreover, during the desorption, the process 4 with the pressure equalization process of 1.5 seconds is performed at lower pressure than the process 1 without the pressure equalization process is. It is considered that the above described effect upon adsorption and desorption contributes to the increase in the concentration of ozone, because ozone of higher concentration can be extracted in the process 4.

As described above, the cross-section of the gas flow passage of each communication passage 21 that is used to equalize the pressure is set so as to allow gas to flow therethrough whose flow amount is greater than an amount of ozone-oxygen mixture gas, or adsorption raw-material gas, to be supplied. This makes it possible to greatly concentrate ozone gas without considerably decreasing the ozone amount. It should be noted that a single communication passage 21 may be used. Alternatively, a plurality of communication passages 21 may be used. In this case, the communication passages 21 are designed in view of the total cross-section thereof.

Example 2

Similar to Example 1 described above, the two adsorbing cylinders 2 with an internal volume of 1 liter, in each of which highly pure silica gel of 650 grams was filled as the ozone gas adsorbent 1, were arranged parallel to each other. The parts of the gas discharge passage 6 connected to both adsorbing cylinders 2 communicated with each other through a communication passage 21 having a bore of ⅜ inches. Likewise, the parts of the joint passage 17 connected to both adsorbing cylinders 2 communicated with each other through the communication passage 21 having a bore of ⅜ inches. Then, ozone-oxygen mixture gas was supplied to the adsorbing cylinders 2 through the gas introduction passage 4 with a supply amount of 14.71 slm, and the apparatus was operated under the condition that an adsorption pressure was 100 kPa·G and ultimate pressure upon desorption was −90 kPa·G in each absorbing cylinder 2. An adsorption-desorption switching cycle was set to 40 seconds. Then, a gas introduction valve 7 and a gas derivation valve 10 for an adsorbing cylinder 2 that had completed the adsorption were closed. Furthermore, a depressurizing step was added, in which the gas discharge valve 18 for the adsorbing cylinder 2 was opened during a predetermined period. After this depressurizing step, a pressure equalization step was performed. It should be noted that during the depressurizing step, the adsorbing cylinder 2 on a desorption side continued a desorption step.

Figure 5:
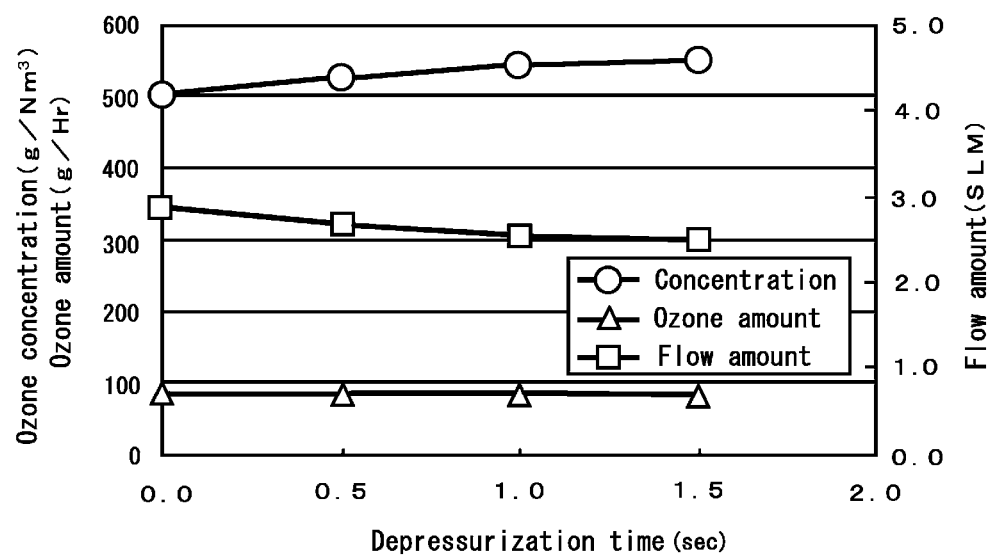
FIG. 5 is a graph showing a relationship between a depressurization time and each of an ozone concentration, an ozone amount, and an ozone flow amount.

A result of concentrating ozone while the durations of depressurizing step and the pressure equalization step are varied is shown in Table 2 and FIG. 5.

TABLE 2

| | Cycle sec | Depressurization sec | Pressure equalization sec | Raw-material concentration g/m³ | Raw-material flow amount slm | Ozone gas concentration g/m³ | Ozone gas flow amount slm | Concentration ratio | Post-depressurization pressure kPa · G |
|---|---|---|---|---|---|---|---|---|---|
| 1 | 40.0 | 0.0 | 0.0 | 130 | 14.71 | 405 | 3.72 | 3.12 | 100, −90 |
| 2 | 40.0 | 0.0 | 0.5 | 130 | 14.71 | 499 | 2.88 | 3.84 | 100, −90 |
| 5 | 40.0 | 0.5 | 0.5 | 130 | 14.71 | 527 | 2.69 | 4.05 | 80, −90 |
| 6 | 40.0 | 1.0 | 0.5 | 130 | 14.71 | 545 | 2.54 | 4.19 | 60, −90 |
| 7 | 40.0 | 1.5 | 0.5 | 130 | 14.71 | 551 | 2.49 | 4.27 | 40, −90 |

Referring to Table 2 and FIG. 5, the post-adsorption pressure is decreased by performing the depressurizing step. It can be been seen from Example 2 that as the depressurization time is prolonged, the post-depressurization pressure is decreased in the adsorbing cylinder 2 on the adsorption side.

Employing the pressure equalization step alone limits the upper value of the adsorption pressure. In Example 1, for example, it is considered that post-adsorption pressure that became 30 kPa·G or less after the pressure equalization was performed with post-desorption pressure of −90 kPa·G, namely, approximately 150 kPa·G is the upper limit of the adsorption pressure. However, introducing the depressurizing enables the adsorption step to be performed at adsorption pressure of more than 150 kPa·G (and less than the withstand pressure of the ozone generator), thereby further increasing the concentration of ozone gas and an ozone amount, and improving the concentration ratio of ozone gas.

Example 2 showed only the experimental example in which the concentration of the concentrated ozone gas was up to 550 g/m³, but this present configuration can generate concentrated ozone gas of approximately 700 g/m³. Furthermore, the present configuration can also easily generate ozone gas of extremely high concentration, such as that of 1710 g/m³ (80 vol %) or 1930 g/m³ (90 vol %), by developing negative pressure at the subsequent stage of the decompression generation section.

The present invention is applicable to not only a semiconductor manufacturing field that requires the stable supply of ozone gas having a high concentration, but also various fields using ozone gas.

What is claimed is:

1. A method of concentrating ozone gas comprising:
   concentrating and purifying ozone gas, including: causing ozone gas contained in ozone-oxygen mixture gas to be selectively adsorbed to adsorbents which are filled in a non-cooled state in at least two adsorbing cylinders arranged parallel to one another; and desorbing the ozone gas from the adsorbents by subjecting a depressurizing process to each adsorbing cylinder during an ozone gas desorption operation; repeating an adsorption step and a desorption step alternately in the at least two adsorbing cylinders; and controlling the adsorbing cylinders, in such a way that one of the adsorbing cylinders is performing the adsorption step while another one of the adsorbing cylinders is performing the desorption step, wherein
   when the adsorption step of the ozone gas and the desorption step thereof are switched over, one of the adsorbing cylinders that has performed the adsorption step is made to communicate with another one of the adsorbing cylinders that has been at a stage of completing the desorption step, thereby equalizing internal pressures thereof, and subsequently, the one of the adsorbing cylinders that has been at an adsorption stage is made to communicate with decompression generation section, thereby desorbing the ozone gas from the adsorbents; and
   a valve placed on an ozone gas inlet side of one of the adsorbing cylinders that has performed the adsorption step is closed while a valve placed on an outlet side thereof is opened, immediately before the pressure equalization step starts, thereby decreasing an internal pressure of the one of the adsorbing cylinders.

2. A method of concentrating ozone gas comprising:
   concentrating and purifying ozone gas, including: causing ozone gas contained in ozone-oxygen mixture gas to be selectively adsorbed to adsorbents which are filled in a non-cooled state in at least two adsorbing cylinders arranged parallel to one another; and desorbing the ozone gas from the adsorbents by subjecting a depressurizing process to each adsorbing cylinder during an ozone gas desorption operation; repeating an adsorption step and a desorption step alternately in the at least two adsorbing cylinders; and controlling the adsorbing cylinders, in such a way that one of the adsorbing cylinders is performing the adsorption step while another one of the adsorbing cylinders is performing the desorption step, wherein when the adsorption step of the ozone gas and the desorption step thereof are switched over, one of the adsorbing cylinders that has performed the adsorption step is made to communicate with another one of the adsorbing cylinders that has been at a stage of completing the desorption step, thereby equalizing internal pressures thereof, and subsequently, the one of the adsorbing cylinders that has been at an adsorption stage is made to communicate with decompression generation section, thereby desorbing the ozone gas from the adsorbents;

termination timing of a pressure equalization step is controlled in such a way that the pressure equalization step is terminated at a stage where an internal pressure difference between respective ones of the adsorbing cylinders that have higher and lower internal pressures reaches 40% or less of the internal pressure difference therebetween at the beginning of the pressure equalization step; and a valve placed on an ozone gas inlet side of one of the adsorbing cylinders that has performed the adsorption step is closed while a valve placed on an outlet side thereof is opened, immediately before the pressure equalization step starts, thereby decreasing an internal pressure of the one of the adsorbing cylinders.

* * * * *